United States Patent [19]

Deane

[11] 4,249,566
[45] Feb. 10, 1981

[54] FLUID PRESSURE-OPERATED VALVES

[75] Inventor: Moray P. Deane, Glasgow, Scotland

[73] Assignee: D S B Valves Limited, Glasgow, Scotland

[21] Appl. No.: 9,670

[22] Filed: Feb. 5, 1979

[51] Int. Cl.³ .............................................. F16K 15/02
[52] U.S. Cl. ................... 137/498; 137/516.11; 137/517; 137/533.17; 137/543.21
[58] Field of Search .............. 137/498, 516.11, 516.15, 137/517, 533.17, 543.21

[56] References Cited

U.S. PATENT DOCUMENTS

| | | | |
|---|---|---|---|
| 1,364,001 | 12/1920 | Shadduck | 137/517 |
| 2,179,144 | 11/1939 | Buttner | 137/517 |
| 2,748,798 | 6/1956 | Withrow | 137/533.17 |
| 3,221,880 | 12/1965 | Wilkinson | 137/516.15 X |
| 4,099,540 | 7/1978 | Papp | 137/516.11 X |

FOREIGN PATENT DOCUMENTS

| | | | |
|---|---|---|---|
| 1503878 | 5/1969 | Fed. Rep. of Germany | 137/498 |
| 1217652 | 5/1960 | France | 137/517 |
| 177448 | 11/1955 | Sweden | 137/498 |
| 192576 | 5/1960 | Sweden | 137/516.11 |

*Primary Examiner*—Robert G. Nilson
*Attorney, Agent, or Firm*—Gerald J. Ferguson, Jr.; Joseph J. Baker

[57] ABSTRACT

An emergency two-way shut-off valve comprises a housing and two valve members having openings therethrough which when the valve members are spaced apart, permit flow of fluid through the valve but, when the valve members are pressed together, are blocked off by imperforate portions of the valve members. Both valve members are movable and spring-urged apart towards respective stops within the housing.

4 Claims, 4 Drawing Figures

FLUID PRESSURE-OPERATED VALVES

This invention relates to fluid pressure-operated valves.

According to the invention there is provided a fluid pressure-operated valve comprising a housing and two valve members at least one of which is movable apart from and towards the other valve member, the valve members having openings therethrough which, when the valve members are spaced apart, permit flow of fluid through the valve but, when the valve members are pressed together, are blocked off by imperforate portions of the valve members.

The valve may be in the form of an emergency two-way shut-off valve in which both valve members are movable and spring-urged apart towards respective stops within the housing.

Thus, in the event of a pipeline failure downstream of the installed valve, the loss of back pressure on the downstream side of the upstream valve member cause a sufficient pressure differential to be set up across the upstream valve member to result in the upstream valve member moving in a downstream direction off its stop against the spring bias into contact with the downstream valve member and thus block-off fluid forward flow through the valve. Conversely in the event of a pipeline failure upstream of the installed valve, the loss of forward pressure on the upstream side of the downstream valve member causes a sufficient pressure differential to be set up across the downstream valve member to result in the downstream valve member moving in an upstream direction off its stop against the spring bias into contact with the upstream valve member and thus block-off fluid back flow through the valve.

The valve may also be in the form of a check valve in which only one of the valve members is movable.

In this case, the valve is installed in a pipeline in such a manner that the movable valve member is downstream of the stationary one. In the event of a reversal in the direction of fluid flow the movable valve member is pushed by fluid pressure into contact with the stationary one to shut off the flow.

Embodiments of the invention will now be described, by way of example, with reference to the accompanying drawings, in which.

Figure 1:
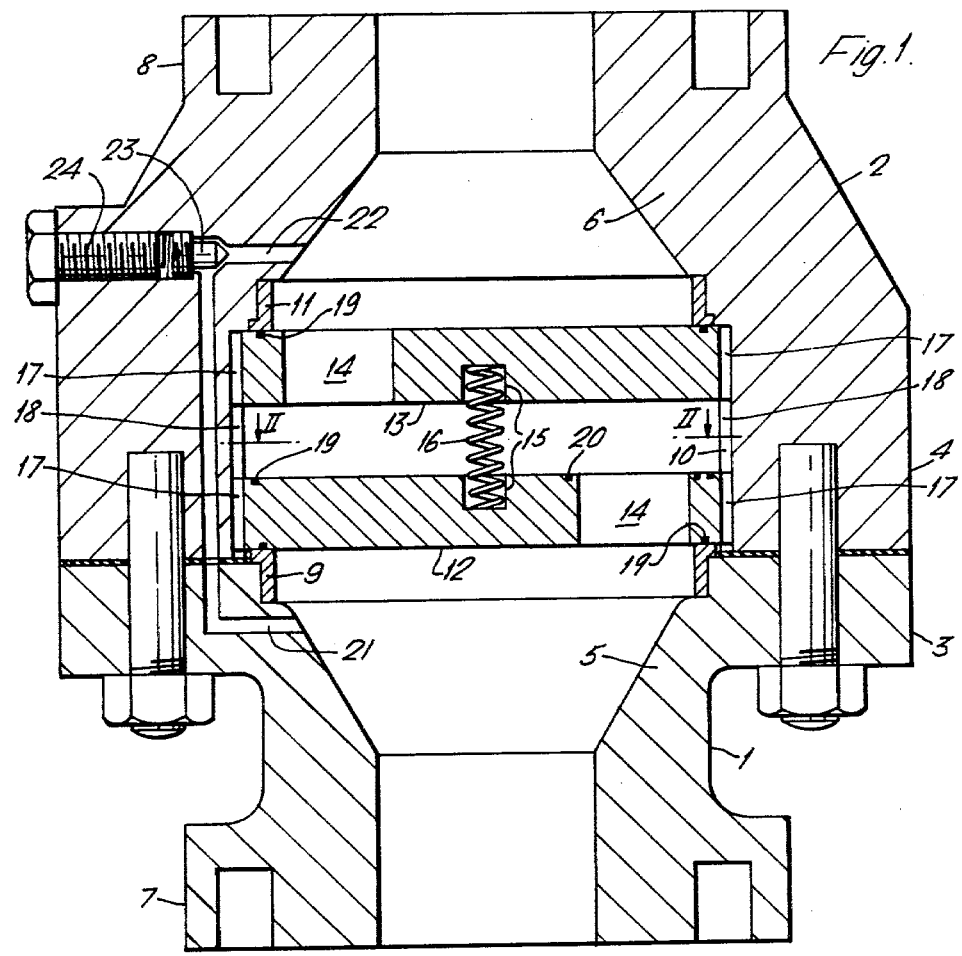
FIG. 1 is an axial section through an emergency two-way shut-off valve.
Figure 2:
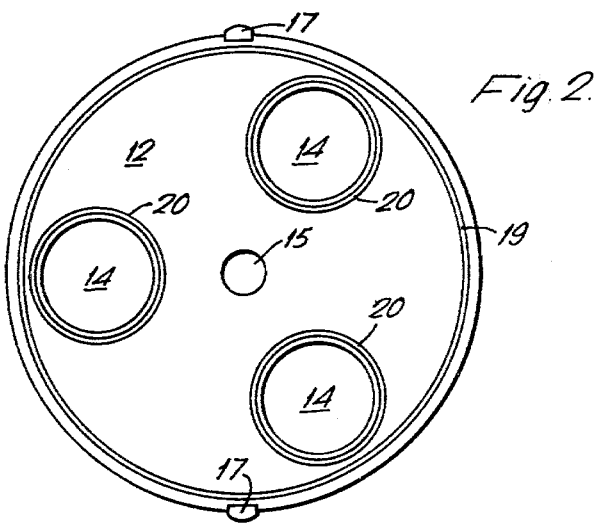
FIG. 2 is a view from line II—II in FIG. 1.

Referring to FIGS. 1 and 2, an emergency two-way shut-off valve comprises a housing formed in two portions 1 and 2 each having at one end an annular flange 3, 4 from which a neck 5, 6 reduces in its internal diameter from about double the internal diameter of the pipeline to the internal diameter of the pipeline at the other end 7, 8 where it can be connected to a pipe end.

Housing portion 1 has a hard steel ring 9 removably fitted about the opening in the face of the flange 3 while the neck 6 of the housing portion 2 has a cylindrical inner surface 10 extending from the face of the flange 4 to a hard steel ring 11 removably fitted within the neck 6.

When the two flanges 3, 4 are bolted or otherwise secured together, the two rings 9, 11 constitute stops for respective valve plates 12, 13 within the housing. Each valve plate 12, 13 is circular with a diameter such as to have a sliding fit within the surface 10. Each valve plate 12, 13 has three bored openings 14 of equal diameter and equally spaced apart. The total area of the three openings 14 in each valve plate 12, 13 is preferably slightly in excess of the cross-sectional area of the pipeline but the area of each opening 14 is less than the area between adjacent openings 14 in each valve plate 12, 13. Also in each valve plate 12, 13 there is provided a central blind hole 15 providing a seat for each end of a compression spring 16 which urges the plates 12, 13 apart against their respective stop rings 9, 11. Means (not shown) may also be provided to stabilise the spring 16, such means may be telescoping sleeves or pins locating the ends of the spring 16 within the blind holes 15. It is necessary that when the valve plates are pressed together each opening 14 in each valve plate is blocked off the area between adjacent openings 14 in the other valve plate. In order to provide this angular relationship between the valve plates 12, 13 two rib formations are disposed diametrically opposite each other on the circumferential surface of each valve plate 12, 13. These rib formations are shown in the form of an axially elongate protruding insert 17 slidable within correspondingly diametrically opposed axially elongate grooves 18. The actual disposition of the inserts 17 on the valve plate 12 is shown in FIG. 2, the showing in FIG. 1 being merely for ease of illustration. Three large diameter 0-rings 19 are set in annular grooves in the valve plates 12, 13 the valve plate 12 having one ring 19 on each side, one to seal against stop ring 9 and the other to seal against the valve plate 13, and the valve plate 13 having one ring 19 to seal stop ring 11. Furthermore, three small diameter 0-rings 20 circumscribe each opening 14 in the valve plate 12 at one side thereof to seal against the valve plate 13 in the areas between adjacent openings 14. A restricted bleed line for fluid across the valve is provided by means of mating channels 21 and 22 in the flanges 3 and 4 respectively. An adjustable restriction is provided in the form of a manually adjustable needle valve member 23 accessible through an opening in the flange 4 threadedly receiving a blanking screw 24.

Under normal operating conditions the spring 16 keeps the valve plates 12, 13 apart so that fluid can flow through the valve, via the opening 14 in the upstream valve plate, the space between the valve plates 12, 13 and the openings 14 in the downsteam valve plate. Turbulence in the space between the valve plates 12, 13 also tend to keep the valve plates 12, 13 apart. In the event of a pipe failure downstream of the valve, the back pressure downstream of the valve will fall and this fall in back pressure will be felt in the space between the valve plates 12, 13 so that pressure differential across the upstream valve plate will rise sufficiently to move the upstream valve plate in a downstream direction against the spring 15 into contact with the downstream valve plate and thus block-off fluid forward flow through the valve. In the event of a pipe failure upstream of the valve, the forward pressure upstream of the valve will fall and this fall in forward pressure will be felt in the space between the valve plates 12, 13 so that the pressure differential across the downstream valve plate will rise sufficiently to move the downstream valve in an upstream direction against the spring 15 into contact with the upstream valve plate and thus block-off fluid back flow through the valve. The restricted bleed 21, 22, 23 across the valve tends to equalise the pressures on both sides of the valve so that ultimately the spring 15 urges one valve plate away from the other so that fluid flow through the valve can begin again.

Figure 3:
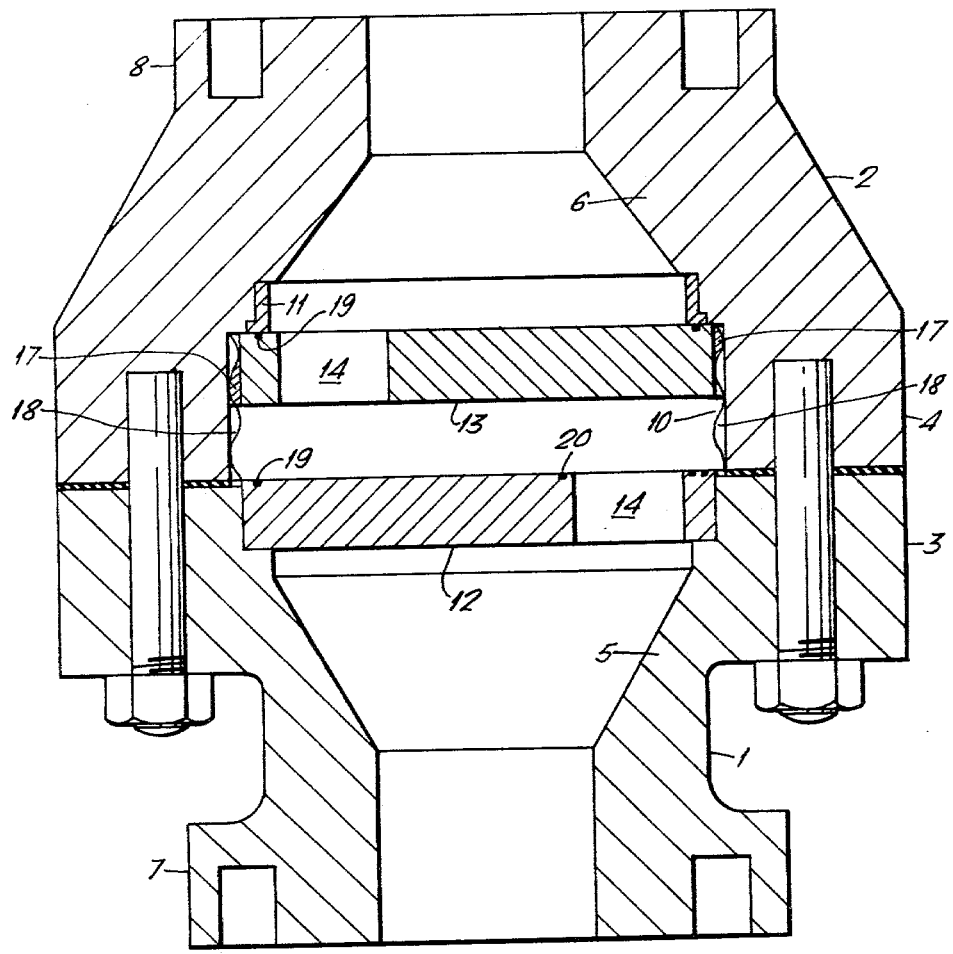
FIG. 3 is an axial section through a check valve.

Referring to FIG. 3, a check valve is similar to the valve shown in FIGS. 1 and 2 except that the valve plate 12 is fixed in the opening in the face of the flange 3 and the ring 9 is omitted. Furthermore the spring 15 is omitted and the valve plate 13 is movable between the stop ring 11 and the fixed valve plate 12.

Normal operating conditions are such that the movable valve plate 13 is downstream of the stationary one 12. If, however, there is a reversal in the direction of flow, the movable valve plate is pushed towards the stationary one so as to shut-off flow in that direction.

The check valve shown in FIG. 3 can be modified by making the fixed valve plate 12 integral with the portion 1. Furthermore, the spring 15 can be used together with items 21, 22, 23 and 24 in FIG. 1.

Either of the valves described and illustrated is designed primarily for use with air, other gas or steam at high or medium pressure. For use with liquids it is desirable to minimise turbulence in the space between the valve plates 12, 13 during normal operation. In such case the grooves 18 may be helical, as indicated in FIG. 3, into which slidingly fit formations 17 projecting from the circumference of both valve plates 12, 13 in FIGS. 1 and 2 and the valve plate 13 in FIG. 3. When the valve plates 12, 13 are fully apart the openings 14 in both valve plates are substantially in alignment with one another so that under normal operating conditions turbulence between the valve plates is minimised. However, due to the helical grooves, when one valve plate moves towards the other the moving valve plate also turns so that when contact is made between the valve plates 12, 13 the openings 14 in each valve plate are blocked off by the areas between adjacent openings 14 in the other valve plate. Preferably, the formations projecting from the circumference of both or one of the valve plates are helical ribs as indicated in FIG. 4.

Figure 4:
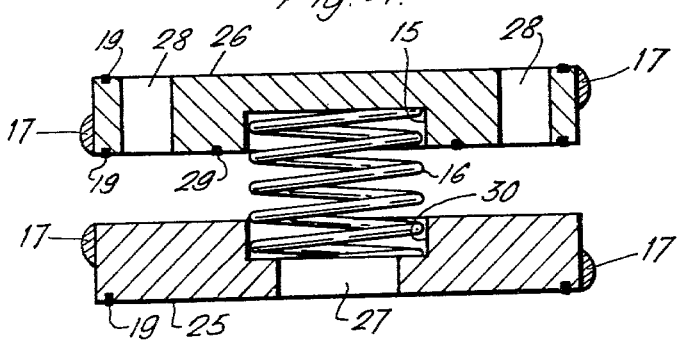
FIG. 4 is an axial section through two modified valve plates which may replace the valve plates in FIGS. 1, 2 and 3.

Either of the valves described and illustrated may be modified by replacing the valve plates 12 and 13 with the valve plates 25 and 26 shown in FIG. 4. A central opening 27 is provided in the valve plate 25 and a ring of smaller openings 28 is provided in the valve plate 26, O-rings 19 are provided as before but the O-rings 20 are replaced by a single O-ring 29 either on the valve plate 26 (as shown) or on the valve plate 25. A spring 16 may be provided between the valve plates with its end seated in the blind hole 15 in the valve plate 26 and in an annular recess 30 in the valve plate 25 surrounding the opening 27.

I claim:

1. An emergency two-way shut-off valve comprising a housing and two valve members each one of which is movable apart from and towards the other valve member and spring-urged apart toward respective stops within the housing, the valve members having openings therethrough which, when the valve members are spaced apart, permit flow of fluid through the valve but, when the valve members are pressed together, are blocked off by imperforate portions of the valve members.

2. A valve according to claim 1, in which there is a plurality of openings through each valve member equally spaced apart around an axis.

3. A valve according to claim 2, in which there are helical grooves in the housing and formations on the circumference of each valve member slidingly fitting into the grooves whereby the movement of one valve member relative to the other valve member is accompanied by a turning movement of the moving valve member so that when the valve members are fully spaced apart the openings therein are in substantial alignment.

4. A valve according to claim 1, in which there is a central opening through one of the valve members and a ring of openings through the other valve member.

* * * * *